United States Patent [19]

Duncan

[11] 4,448,374
[45] May 15, 1984

[54] DEPLOYMENT SEQUENCER

[75] Inventor: James W. Duncan, Arden, N.C.

[73] Assignee: Stencel Aero Engineering Corporation, Arden, N.C.

[21] Appl. No.: 384,636

[22] Filed: Jun. 3, 1982

[51] Int. Cl.³ .................... B64D 17/56; B64D 17/58
[52] U.S. Cl. ..................... 244/150; 244/122 A; 244/141; 244/147; 244/149; 244/152; 244/138 R; 244/122 AE; 318/345 G; 318/345 H
[58] Field of Search ........... 244/141, 122 A, 122 AE, 244/147, 138 R, 149, 150, 152; 318/345 G, 345 H, 481; 340/522, 521, 517, 626

[56] References Cited

U.S. PATENT DOCUMENTS

| | | | |
|---|---|---|---|
| 2,505,869 | 5/1950 | Quilter | 244/150 |
| 2,693,326 | 11/1954 | Lobelle | 244/122 |
| 2,699,305 | 1/1955 | Turner et al. | 244/141 |
| 2,967,686 | 1/1961 | Fogal et al. | 244/150 |
| 3,067,973 | 12/1962 | Halsey et al. | 244/140 |
| 3,311,330 | 3/1967 | Hofferberth et al. | 244/141 |
| 3,352,518 | 11/1967 | Turner et al. | 244/122 |
| 3,355,127 | 11/1967 | Stanley et al. | 244/122 |
| 3,421,720 | 5/1969 | MacDonald, Jr. et al. | 244/122 |
| 3,547,383 | 12/1970 | Carpenter, Jr. | 244/150 |
| 3,590,739 | 7/1971 | Persson | 102/27 |
| 3,669,388 | 6/1972 | Van Kreuningen | 244/138 R |
| 3,726,499 | 4/1973 | Stencel | 244/141 |
| 3,862,731 | 1/1975 | McIntyre | 244/141 |
| 4,057,206 | 11/1977 | Duncan et al. | 244/147 |

Primary Examiner—Trygve M. Blix
Assistant Examiner—Ivy M. Shum
Attorney, Agent, or Firm—Roylance, Abrams, Berdo & Goodman

[57] ABSTRACT

A parachute deployment sequencer includes two sequencer systems in electromagnetic shielding housings. Each housing contains two bellows connected to pitot tubes, a third bellows for measuring ambient pressure and three switch contact sets connected in series, each contact set being operated by one of the bellows. Each housing also contains a battery actuated by seat ejection and a deployment firing circuit with a series switch circuit in between. After ejection, deployment is initiated when all three switches are closed.

4 Claims, 3 Drawing Figures

DEPLOYMENT SEQUENCER

This invention relates to an improved control device for parachute deployment in the context of an aircraft ejection seat.

BACKGROUND OF THE INVENTION

The basic operation and functions of various parts of ejection apparatus are now rather well known, although there are different approaches to solving the problems. In one form of system, the canopy is eliminated, the seat and occupant are propelled out of the aircraft through the canopy opening, and a parachute is deployed to lower the occupant safely to earth. Other systems use capsules enclosing the occupant, or other techniques, but those are not of relevance here.

Various problems inherent in ejection and deployment, which are familiar to those skilled in this art, are determining the speed and altitude and, in some cases, the attitude, of the seat at the time of ejection and either measuring conditions or estimating a time after ejection at which a parachute can or must be deployed to give reasonable assurance of safety to the occupant. If the speed is too great, the parachute can be damaged when it opens or the occupant can be subjected to excessive deceleration shock, or both. These and other problems, and some of the solutions to them, are discussed in the following U.S. patents:

U.S. Pat. No. 2,505,869 Quilter,
U.S. Pat. No. 2,693,326 Lobelle,
U.S. Pat. No. 2,699,305 Turner et al.
U.S. Pat. No. 3,067,973 Halsey et al.
U.S. Pat. No. 3,311,330 Hofferberth et al.
U.S. Pat. No. 3,352,518 Turner et al.
U.S. Pat. No. 3,355,127 Stanley et al.
U.S. Pat. No. 3,421,720 MacDonald, Jr., et al.
U.S. Pat. No. 3,547,383 Carpenter, Jr.
U.S. Pat. No. 3,669,388 Van Kreuningen
U.S. Pat. No. 3,726,499 Stencel
U.S. Pat. No. 3,862,731 McIntyre
U.S. Pat. No. 4,057,206 Duncan et al.

While some of the techniques disclosed in these references can be successfully employed, certain problem areas remain, particularly in the reliability of the control equipment and in the accuracy of the airspeed determination.

The control equipment, commonly referred to as a "sequencer", involves electronic circuit apparatus, to a greater or lesser degree of complexity, depending on the design approach used. It has been found that these control circuits are subject to disturbance by electromagnetic "noise", i.e., ambient radio and radar transmissions which have no direct connection with the system. Thus, the control apparatus sometimes fails to operate properly when the aircraft is "immersed" in radio and radar signals from, for example, an aircraft carrier or the control tower of a field on which the aircraft is supposed to land.

Also, because the travel characteristics of a seat and occupant, apart from the aircraft, are difficult to predict accurately, there have been problems in determining the optimum time at which parachute deployment and seat/occupant separation should occur.

BRIEF DESCRIPTION OF THE INVENTION

An object of the present invention is to provide an improved parachute deployment control apparatus in which the operational reliability is improved.

A further object is to provide such an apparatus in which airspeed determination is improved, thereby assuring that the parachute deployment will be accomplished under suitable circumstances.

Briefly described, the invention includes a sequencing apparatus for controlling the initiation of the deployment of a parachute following ejection of a seat from an aircraft comprising the combination of a parachute and means carried by the seat for deploying the parachute; left and right pitot tubes carried by said seat; a housing carried by said seat; first, second and third pneumatically operated bellows in said housing, each said bellows being operable between a retracted position and an extended position; first, second and third switches in said housing, each of said switches including a contact set, and operator means connected to said contract set and to one of said bellows for closing said contact set when said one of said bellows is moved to its extended position; a battery; circuit means for connecting said contact sets of said first, second and third switches in series circuit relationship with each other and to said battery and said means for deploying said parachute; first conduit means for coupling ambient air pressure to said first one of said bellows so that the switch associated therewith is closed at and below a predetermined altitude; and second and third conduit means for coupling free stream pressures from said left and right pitot tubes to said second and third bellows, respectively, so that each switch associated therewith is closed whenever the pressure to which the associated tube is exposed is indicative of an air speed below a preselected speed, whereby closure of all three of said switches permits operation of said means for deploying.

In another aspect, the invention includes a sequencing apparatus for controlling the initiation of the deployment of a parachute following ejection of a seat from an aircraft comprising the combination of a parachute and means carried by the seat for deploying the parachute; left and right pitot tubes carried by said seat; first and second substantially identical housings carried by said seat; first, second and third pneumatically operated bellows in each of said housings, each said bellows being operable between a retracted position and an extended position; first, second and third switches in each of said housings, each of said switches including a normally closed contact set, and operator means connected to said contact set and to one of said bellows in the same housing for closing said contact set when said one of said bellows is moved to its extended position; a battery in each housing; circuit means for connecting said contact sets of said first, second and third switches in each housing in series circuit relationship with each other and to the battery within the same housing with said switches and said means for deploying said parachute; first conduit means for coupling ambient air pressure to said first ones of said bellows in said housings so that the switch associated therewith is closed at and below a predetermined altitude; and second and third circuit means for coupling free stream pressures from said left and right pitot tubes to both of said second and third bellows so that each switch associated therewith is closed whenever the pressure to which the associated tube is exposed is indicative of an air speed below a preselected speed, whereby closure of all three of said switches in either housing permits operation of said means for deploying.

In order that the manner in which the foregoing and other objects are attained in accordance with the invention can be understood in detail, a particularly advantageous embodiment thereof will be described with reference to the accompanying drawings, which form a part of this specification, and wherein.

Figure 1:
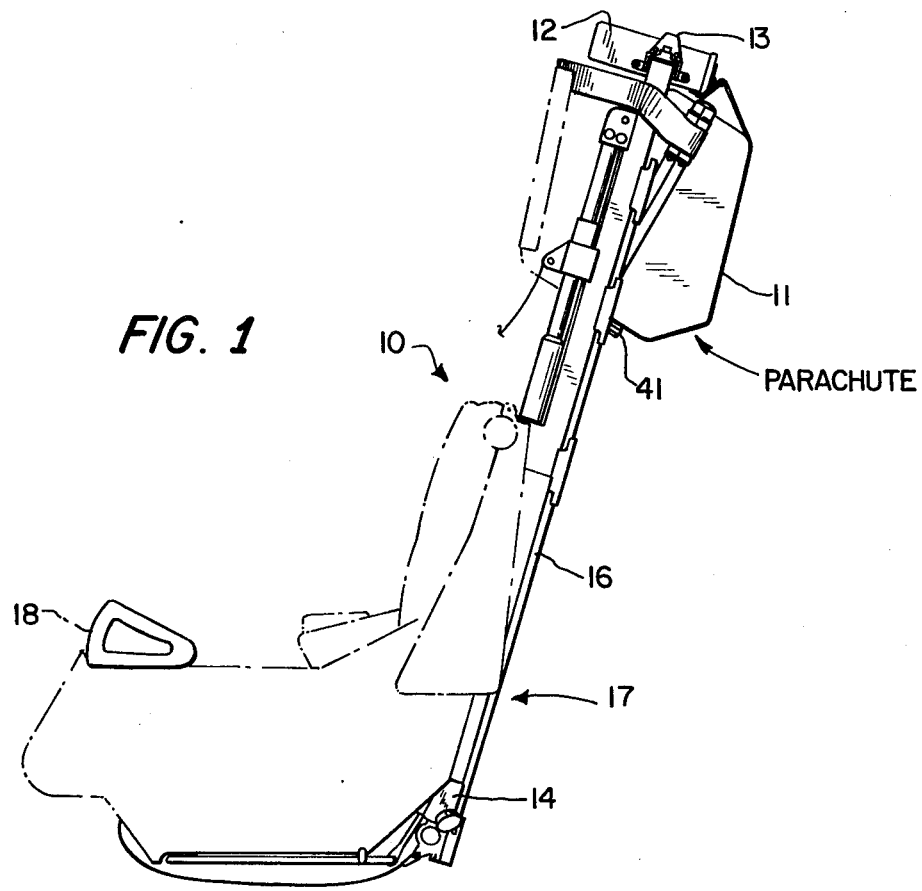
FIG. 1 is a simplified side elevation of an aircraft seat of the type usable with the present invention.

FIG. 1 shows a typical crew station including an ejectable seat of a type with which the invention can advantageously be used. The apparatus, which is schematically illustrated to establish the environment and general type of equipment which the invention is usable, includes an ejection seat indicated generally at 10 which carries with it a parachute in a parachute housing 11 and a drogue chute in a drogue housing 12. At the upper end of the seat is a canopy penetrating device 13 and the seat also carries apparatus 14 for propelling the seat out of the cockpit, the seat being provided with runners which can ride along rails 16 forming part of the aircraft which remains therein after ejection.

The ejection mechanism itself, including the specific parachutes, the housings and the automatic apparatus for removing the housings at an appropriate time, are not part of the present invention and will not be further described. Various forms of these devices can be employed.

Of particular interest to the present invention is the provision of two substantially identical metal housings which can be located in the region 17 between the back support and the seat bucket structure. Also of interest in FIG. 1 is the provision of a manually operable handle 18 by which the ejection mechanism can be actuated.

Figure 2:
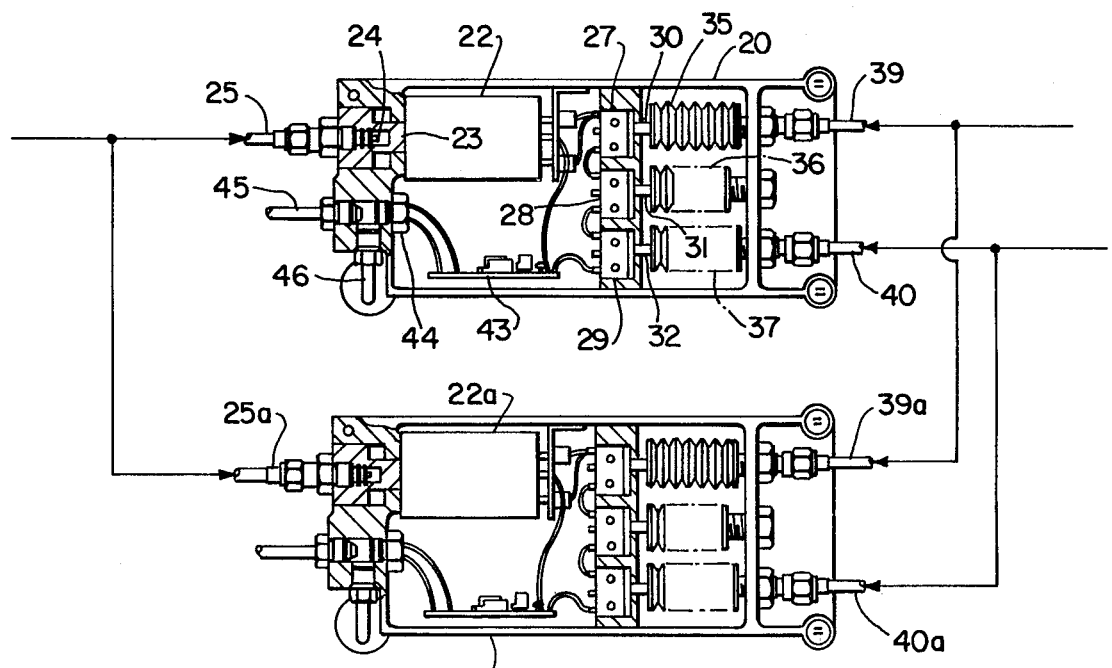
FIG. 2 is a top plan view, in partial section, of redundant sequencers in accordance with the present invention.

The housings are illustrated in FIG. 2, apart from the seat structure, with the flat, metal covers thereof removed. As will be seen therein, the two housings 20, 21 are substantially identical to each other. Each housing is a metal container which is substantially continuous except for openings to permit the entrance of various conduits and other devices. Thus, each housing forms a very effective shield against electromagnetic interferences such as might be created by ambient radar and radio signals, preventing such signals from affecting the electronic devices within the housings. Housings 20 and 21 contain identical equipment. Thus, only the devices within housing 20 will be described, and it will be understood that those in housing 21 have the same structure and function.

Housing 20 includes a thermal battery 22 which is of a type which is capable of producing between 10 and 35 volts DC and is capable of providing a minimum of 6 amperes to a 1 ohm resistance load. A thermal battery of this type provides no output until its operation is intentionally commenced, whereupon after a delay of about 0.025 seconds, the output voltage is provided for an interval of 300 seconds. Activation of the battery is commenced by firing a pistol or percussion primer 23, which firing is accomplished by a firing pin 24. Movement of the firing pin is accomplished by gas pressure provided in a conduit 25 from a pressure tap on the catapult itself, not shown. Thus, upon ejection of the seat, gas supplied through conduit 25 starts the battery in operation.

Housing 20 also includes three hermetically sealed switch units 27, 28 and 29, each containing a normally closed contact set which is moved between its opened and closed positions by movement of an operator member 30, 31, and 32. The operator members extend toward and engage one end of each of three bellows 35, 36 and 37. Bellows 35 and 37 are coupled to conduits 39 and 40, respectively, which are connected to left hand and right hand pitot tubes 41, respectively, which are mounted on opposite sides of parachute container 11. The tubes used are Keil type pitot tubes which are accurate devices for responding to the total pressure head even when misaligned with the airstream by as much as 45°. Thus, bellows 35 and 37 are actuated by the total free stream pressure from the right and left hand pitot tubes.

Bellows 36 is open to ambient pressure and, therefore, responds to a pressure representative of altitude. This bellows can be set so that switch 35 or 37 will be open if the airspeed of the seat, after ejection, is above 325 KEAS (knots equivalent airspeed) and switch 28 will be open if the altitude is above a pressure altitude of 14,000 feet. The switches will remain open until the speed or altitude drop below those preselected figures. As will be recognized, other speed and altitude parameters could be chosen, but these are selected as representing speed and altitude conditions above which a parachute cannot safely be deployed. In this connection, it should be noted that prior art escape systems are commonly "biased" such that following any ejection above a certain "threshhold" airspeed (typically between 200 and 300 KEAS) deployment is accomplished only after an elapsed time equivalent to that required for an ejection at 600 KEAS. This imposes an extreme time penalty on any ejection which occurs just above this threshhold or crossover speed.

Figure 3:
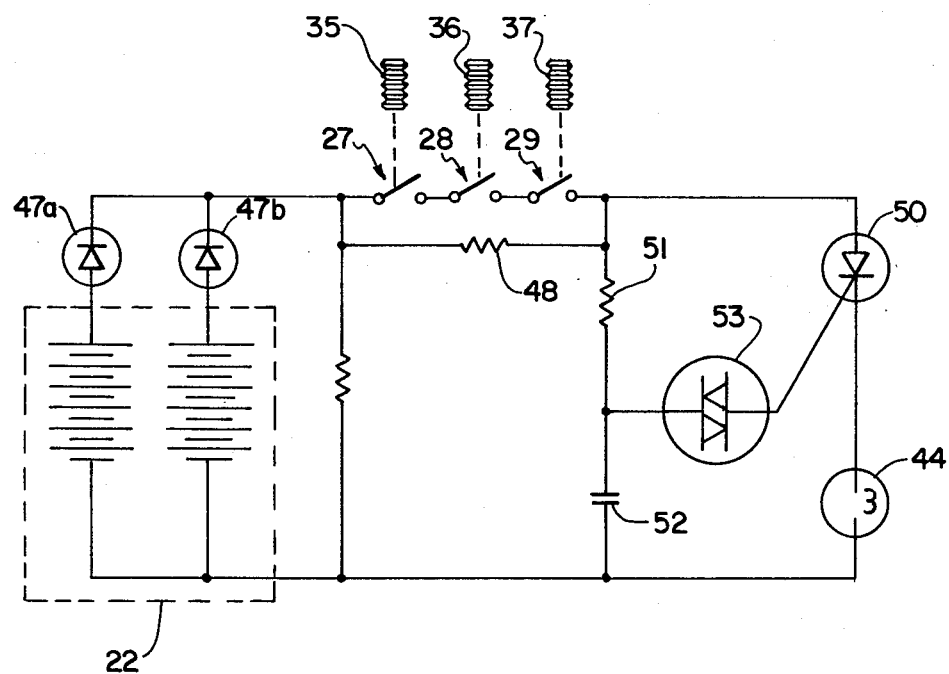
FIG. 3 is a schematic circuit diagram of an actuating circuit usable in the apparatus of FIG. 2.

The contact sets of switches 27, 28 and 29 are connected in series circuit relationship, as will be seen in the electrical schematic diagram of FIG. 3. The other components shown in FIG. 3 include the battery 22, various circuit components which are mounted on a circuit board 43 and an exploding bridge wire initiator 44. Initiator 44 is connected to two TLX transmission lines 45 and 46. Each of the TLX lines is a flexible plastic tube enclosed within a braided stainless steel protective cover. The tube contains an integrally extruded reactive (pyrotechnic) material on the inside surface which, when ignited at one end, carries the signal reliably from one end to the other. The velocity of the signal is 6500 feet per second. The TLX line is initiated at either end by the firing of a pistol primer, a bridge wire initiator, or another TLX line. However, it is not initiated by exposure to flame or other accidental circumstances likely to arise in an aircraft.

The TLX lines shown in FIG. 2 extend to the torso restraint mechanisms normally provided on ejection seats, to hold the occupant firmly in the seat, and to the cover releases for the drogue and parachute containers 11 and 12.

The circuit, as shown in FIG. 3, includes two parallel cell packs within battery 22 which are, in parallel, connected to diodes 47a and 47b. These diodes are connected to one end of the series circuit including the contact sets from switches 27, 28 and 29, which circuit is paralleled by a fixed resistance 48. The other end of the series-parallel circuit is connected to an SCR 50 and to a resistor 51 which is part of a series RC circuit, the other part being capacitor 52. The junction between the resistor and capacitor is connected through a diac 53 to the gate of SCR 50. The output of SCR 50 is connected to bridge wire initiator 44.

The RC circuit including resistor 51 and capacitor 52 provides a small time delay of approximately 0.050 seconds. This, combined with the delay in initiation of the thermal battery of 0.025 seconds, gives a total delay of 0.075 seconds before possible activation of the circuit. It will be observed that because of the provision of resistor 48 in parallel with the series switch circuit the RC time delay expires, normally, before any of switches 27–29 are closed. Thus, any time after 0.075 seconds beyond catapult operation and seat ejection, the sequencer is prepared to fire exploding bridge wire initiator 44 as soon as all three of the switches are closed. Again, the initiator starts the various TLX transmission lines to initiate the post-ejection functions of restraint release, drogue release and parachute container opening.

It is particularly important to recognize that the control sequencer is totally redundant, each of the two housings 20 and 21 containing equipment capable of initiating deployment, each container being supplied with the pressure impulse to activate its battery and the pitot pressure tube input to operate the bellows, in parallel. Additionally, each unit is small and compact, and all electrical components subject to electromagnetic interference are housed in a shielded box. Thus, optimum reliability is provided.

While one advantageous embodiment has been chosen to illustrate the invention, it will be understood by those skilled in the art that various changes and modifications can be made therein without departing from the scope of the invention as defined in the appended claims.

What is claimed is:

1. A sequencing apparatus for controlling the initiation of the deployment of a parachute following ejection of a seat from an aircraft comprising the combination of a parachute and means carried by the seat for deploying the parachute;

left and right pitot tubes carried by said seat;

a housing carried by said seat;

first, second and third pneumatically operated bellows in said housing, each said bellows being operable between a retracted position and an extended position;

first, second and third switches in said housing, each of said switches including a contact set, and operator means connected to said contact set and to one of said bellows for closing said contact set when said one of said bellows is moved to a predetermined one of said positions;

a battery;

circuit means for connecting said contact sets of said first, second and third switches in series circuit relationship with each other and to said battery and said means for deploying said parachute;

first conduit means for coupling ambient air pressure to said first one of said bellows so that the switch associated therewith is closed at and below a predetermined altitude; and second and third conduit means for coupling free stream pressures from said left and right pitot tubes to said second and third bellows so that each switch associated therewith is closed whenever the pressure to which the associated tube is exposed is indicative of an air speed below a preselected speed, whereby closure of all three of said switches permits operation of said means for deploying.

2. An apparatus according to claim 1 wherein said battery comprises an actuatable thermal battery having no output until actuation;

and said apparatus further comprises means responsive to ejection of said seat for actuating said battery.

3. An apparatus according to claim 1 wherein said housing comprises a substantially continuous electrically conductive shell forming an electromagnetic shield.

4. A sequencing apparatus for controlling the initiation of the deployment of a parachute following ejection of a seat from an aircraft comprising the combination of a parachute and means carried by the seat for deploying the parachute;

left and right pitot tubes carried by said seat;

first and second substantially identical housings carried by said seat;

first, second and third pneumatically operated bellows in each of said housings, each said bellows being operable between a retracted position and an extended position;

first, second and third switches in each of said housings, each of said switches including a normally closed contact set, and operator means connected to said contact set and to one of said bellows in the same housing for closing said contact set when said one of said bellows is moved to its extended position;

a battery in each housing;

circuit means for connecting said contact sets of said first, second and third switches in each housing in series circuit relationship with each other and to the battery within the same housing with said switches and said means for deploying said parachute;

first conduit means for coupling ambient air pressure to said first ones of said bellows in said housings so that the switch associated therewith is closed at and below a predetermined altitude; and second and third conduit means for coupling free stream pressures from said left and right pitot tubes to both of said second and third bellows so that each switch associated therewith is closed whenever the pressure to which the associated tube is exposed is indicative of an air speed below a preselected speed, whereby closure of all three of said switches in either housing permits operation of said means for deploying.

* * * * *